United States Patent [19]

Hoenig

[11] Patent Number: 5,116,589
[45] Date of Patent: May 26, 1992

[54] HIGH DENSITY HEXAGONAL BORON NITRIDE PREPARED BY HOT ISOSTATIC PRESSING IN REFRACTORY METAL CONTAINERS

[75] Inventor: Clarence L. Hoenig, Livermore, Calif.

[73] Assignee: The United States of America as represented by the United States Department of Energy, Washington, D.C.

[21] Appl. No.: 539,393

[22] Filed: Jun. 18, 1990

[51] Int. Cl.$^5$ ............................................. C04B 35/64
[52] U.S. Cl. ................................. 423/298; 501/96; 264/56; 264/65
[58] Field of Search ...................... 423/298; 501/96; 264/56, 65

[56] References Cited

U.S. PATENT DOCUMENTS

| | | | |
|---|---|---|---|
| 4,381,931 | 5/1983 | Hunold et al. | 65/18.1 |
| 4,634,646 | 1/1987 | Hunold et al. | 423/290 |
| 4,952,353 | 8/1990 | Neil | 264/65 |
| 4,956,315 | 9/1990 | Mehrota et al. | 501/96 |
| 4,983,339 | 1/1991 | Boncoeur et al. | 264/56 |

FOREIGN PATENT DOCUMENTS

| | | | |
|---|---|---|---|
| 0058618 | 8/1982 | European Pat. Off. | 423/298 |
| 0192391 | 8/1986 | European Pat. Off. | 501/96 |
| 1792696 | 7/1982 | Fed. Rep. of Germany | 423/290 |
| 2619103 | 2/1989 | France . | |
| 0166271 | 8/1985 | Japan | 501/96 |

Primary Examiner—Olik Chaudhuri
Assistant Examiner—Ken Horton
Attorney, Agent, or Firm—Henry P. Sartorio; L. E. Carnahan; William R. Moser

[57] ABSTRACT

Boron nitride powder with less than or equal to the oxygen content of starting powder (down to 0.5% or less) is hot isostatically pressed in a refractory metal container to produce hexagonal boron nitride with a bulk density greater than 2.0 g/cc. The refractory metal container is formed of tantalum, niobium, tungsten, molybdenum or alloys thereof in the form of a canister or alternatively plasma sprayed or chemical vapor deposited onto a powder compact. Hot isostatic pressing at 1800° C. and 30 KSI (206.8 MPa) argon pressure for four hours produces a bulk density of 2.21 g/cc. Complex shapes can be made.

14 Claims, 1 Drawing Sheet

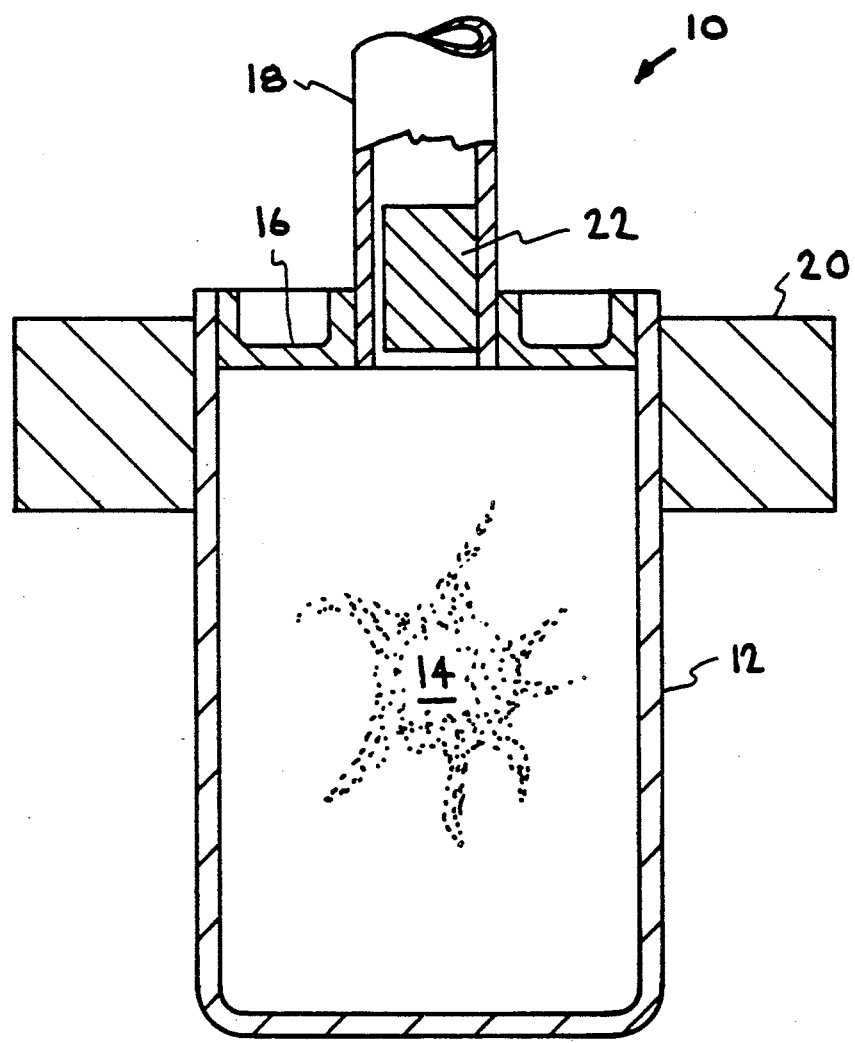

HIGH DENSITY HEXAGONAL BORON NITRIDE PREPARED BY HOT ISOSTATIC PRESSING IN REFRACTORY METAL CONTAINERS

BACKGROUND OF THE INVENTION

The U.S. Government has rights in this invention pursuant to Contract No. W-7405-ENG-48 between the U.S. Department of Energy and the University of California for the operation of Lawrence Livermore National Laboratory.

The invention relates generally to fabrication of high density refractory materials and more particularly to the fabrication of high density hexagonal boron nitride by hot isostatic pressing.

Boron nitride is a refractory material which has a number of uses. Because of its high dielectric constant, good thermal conductivity, high strength and low thermal expansion, boron nitride has extensive use in high powered electronic applications such as insulators and substrates. High temperature stability and excellent resistance to thermal shock allow its use in many high temperature applications such as molten metal containment, plasma arc components, semiconductor crystal growth equipment, vacuum furnaces and welding equipment. In its hot-pressed form boron nitride can be machined with conventional machine shop equipment extending its versatility.

For many applications, hot-pressed boron nitride with high density and low oxygen concentration is required. Hot pressed boron nitride is conventionally made by unidirectional hot pressing in graphite. The best commercially available hot-pressed boron nitrides have densities in the range of 1.90–2.00 g/cc. Oxygen concentrations vary from 1.0 to 3.9 percent. Higher density is traded off with undesirable higher oxygen concentration. Although boron nitride powders used for hot pressing are available with 0.5% oxygen or less, the oxygen concentration of the hot pressed product increases with density because of boron oxide binder additions. The boron nitride with a density of 2.0 g/cc has an oxygen concentration of about 3.9%, while a boron nitride material with an oxygen concentration of 1% has a density of only 1.90 g/cc. Thus, it would be desirable to produce a hot-pressed boron nitride material with both increased density and decreased oxygen concentration.

Another problem with the production of boron nitride is that the use of conventional unidirectional hot pressing in graphite produces a material which has variable properties along the pressing axis. Also, complex shapes cannot be produced by conventional unidirectional hot pressing which is limited to simple right cylinder shapes. Additionally, low product densities are produced because of low pressure-low strength limitations of graphite hot pressing. A material with isotropically uniform properties (uniform microstructure) and higher density is desired. The ability to produce complex shapes is also desired. Accordingly, it would be advantageous to form boron nitride by a process other than conventional graphite hot pressing.

SUMMARY OF THE INVENTION

Accordingly it is an object of the invention to provide a method for forming high density boron nitride with isotropically uniform properties.

It is also an object of the invention to provide a method of forming high purity boron nitride including a low oxygen content.

It is another object of the invention to provide a method for producing boron nitride with a density greater than 2.0 g/cc and an oxygen content equal to or less than that of the starting powder (down to 0.5% or less).

It is a further object of the invention to provide high density hexagonal boron nitride.

It is also an object of the invention to provide hexagonal boron nitride with a density greater than 2.0 g/cc.

It is another object of the invention to provide hexagonal boron nitride with a density of greater than 2.0 g/cc and an oxygen content down to 0.5% or less.

It is also an object of the invention to form high density boron nitride into complex shapes with isotropically uniform microstructure.

The invention is a method of forming high density high purity hexagonal boron nitride with isotropically uniform microstructure (uniform in all directions) by hot isostatic pressing in refractory metal containers. The refractory metal containers are preferably formed of tantalum, niobium, tungsten, molybdenum or alloys of these metals. Commercially available boron nitride powder, preferably powder with 0.5 weight percent oxygen or less, is hot isostatically pressed at up to 1800° C., and up to 30 KSI (206.8 MPa) argon pressure for up to four hours. A hermetically sealed refractory metal canister is utilized; the starting powder may be loaded at tap density or prepressed to form a powder compact prior to HIP processing. Alternatively the container is formed by Plasma Spraying (PS), Chemical Vapor Deposition (CVD), or some other suitable coating process of the refractory metal on a boron nitride powder compact.

The invention also includes the resulting product, hot-isostatically-pressed hexagonal boron nitride having a density of greater than 2.0 g/cc and an oxygen content of down to 0.5 weight percent or less and an isotropically uniform microstructure (directionally uniform).

BRIEF DESCRIPTION OF THE DRAWINGS

In the accompanying drawings:

The FIGURE is a sectional view of a HIP can assembly.

DETAILED DESCRIPTION OF THE PREFERRED EMBODIMENTS

The invention is a method for forming high density hexagonal boron nitride and the resulting high density hexagonal boron nitride product formed thereby. Commercially available low oxygen content boron nitride powder, preferably having less than about 0.5 weight percent oxygen, is used as the starting material. The boron nitride powder is placed in a hermetically sealed container made of a refractory metal selected from tantalum, niobium, tungsten, molybdenum and alloys thereof. The starting powder may be either loaded at tap density or prepressed isostatically and machined to fit the container. The boron nitride powder may be prepressed to facilitate loading into the containers and to help control final shrinkage. The container loaded with prepressed boron nitride powder is then heated and evacuated (subject to vacuum) to remove any residual water vapor and other gases in order to enhance final densification. The container is then hermetically sealed and leak checked. The sealed container is hot isostatically pressed (HIP) at suitable temperature and pressure for a suitable time interval. In a preferred embodiment of the process the boron nitride powder in a tantalum container is HIPed at 1800° C. and 30 KSI (206.8 MPa) argon pressure for four hours. After HIP densification the boron nitride product is removed from the container, e.g. by machining away the container or etching or other suitable process. The container material can be salvaged and reprocessed.

In accordance with the invention a refractory canister can be utilized as the container. This type container can be evacuated prior to HIPing to improve densification. As shown in the Figure, a HIP can assembly 10 is made up of a tantalum or other refractory metal container 12 which is filled with (prepressed) boron nitride powder 14. A tantalum or other refractory metal lid 16 which has a tantalum or other refractory metal pump out tube 18 attached thereto is welded to the top of powder filled container 12. A copper chill block 20 can be attached around the top of container 12 to act as a heat sink when lid 16 is welded to container 12. A tantalum or other refractory metal support cylinder 22 is placed in tube 18 at the attachment junction to lid 16. Cylinder 22 is a metal rod of diameter less than the diameter of tube 18 to allow the interior of container 12 to be pumped out before sealing but to protect the lid 16-tube 18 attachment joint from total collapse during the HIP process. Container 12 is sealed by pinching off tube 18 above cylinder 22. A typical container is cylindrical, with an outer diameter of 1.5 inches, a height of 2 inches and a wall thickness of 0.062 inches (or about 3.8 cm × 5.1 cm × 1.6 mm).

However, this type canister can exhibit some mechanical disadvantages such as seams, welded joints and the like. An alternative container can be formed by either plasma spraying, chemical vapor deposition or any other suitable coating process, of the refractory metal directly onto a preformed boron nitride powder body.

Although a typical canister or container will be cylindrical in shape, the invention can be practiced with different shaped containers. The HIP process is well suited to complex shapes. A noncylindrical canister can be loaded with powder, or a preformed powder body of complex shape can be coated with refractory metals.

The HIP process can be carried out over a wide range of temperature, pressure and time parameters to produce a boron nitride product with desired characteristics. A Model QIH 33 Hot Isostatic Pressing System (ABB Autoclave Systems, Inc., 3721 Corporate Drive, Columbus, OH 43229) capable of 2200° C. temperature and 30 KSI (206.8 MPa) pressure was used. A detailed illustrative processing sequence is as follows:

Step 1: After leak checking, the hermetically sealed container is placed into the HIP furnace chamber.

Step 2: The HIP chamber is evacuated and back filled with pure Argon gas at 300° C. (A pure inert atmosphere is used to prevent container and furnace oxidation).

Step 3: The temperature and pressure are then increased to up to 1800° C. and up to 30 KSI (206.8 MPa) at any suitable rate. A typical HIP furnace specification permits heating at 1000° C./hour. Experimentally, a rate of 375° C./hour was used.

Step 4: Hold at up to 1800° C. and up to 30 KSI (206.8 MPa) for 1-4 hours.

Step 5: Cool to room temperature and one atmosphere pressure at any suitable rate. A typical HIP furnace specification permits cooling at 1000° C./hour. Experimentally a rate of 160° C./hour was used.

Step 6: Open HIP furnace, retrieve HIP canister and remove boron nitride.

Experimentally, boron nitride starting powder (from Union Carbide Corporation) having an initial particle size of less than 1.0 micron was isostatically prepressed to an initial density of 84% theoretical density. The prepressed boron nitride powder compact was then hot isostatically pressed in accordance with the invention, at 1800° C./206.8 MPa/4 hr., to a final density of 97% theoretical density.

In accordance with the invention a hexagonal boron nitride product with a measured bulk density of 2.21 g/cc was obtained, a material with 97% of theoretical density (2.28 g/cc for the hexagonal form). This density is about 16% greater than that previously available in industry for low oxygen content boron nitride hot pressed in graphite. Chemical analysis also shows less than 1.0 weight percent oxygen and spectrochemical analysis shows less than 1000 ppm tantalum. Chemical analysis for boron content shows 43.2 wt. % with a standard deviation of 0.27 wt. % (theoretical is 43.6 wt. %). Metallographic analyses of the tantalum container show no significant reaction with the boron nitride product. X-ray analysis confirms a hexagonal structure. Thus a higher density low oxygen content hot-isostatically-pressed boron nitride material is produced which will provide superior high temperature properties. Because an isostatic process is used, the product will have a more uniform (isotropic) microstructure in all directions.

Changes and modifications in the specifically described embodiments can be carried out without departing from the scope of the invention which is intended to be limited only by the scope of the appended claims.

I claim:

1. A method of densifying hexagonal boron nitride comprising:
    placing boron nitride powder in a refractory metal container consisting essentially of tantalum, niobium, tungsten, molybdenum or alloys thereof;
    hot isostatically pressing the refractory container filled with boron nitride powder at about 1800 C. and at about 30 KSI (206.8 MPa) to form boron nitride with a bulk density greater than 2.0 g/cc and an isotropically uniform microstructure.

2. The method of claim 1 further comprising:
    forming the refractory metal container with a wall thickness of about 1.6 mm.

3. The method of claim 1 wherein the container is a refractory metal canister.

4. The method of claim 1 further comprising:
    forming the refractory metal container by coating a refractory metal onto a preformed boron nitride powder compact.

5. The method of claim 4 wherein the step of coating is performed by plasma spraying or chemical vapor deposition.

6. The method of claim 3 wherein the canister has a noncylindrical shape.

7. The method of claim 4 further comprising: forming the boron nitride powder compact with a noncylindrical shape.

8. The method of claim 1 wherein the step of hot isostatically pressing is performed for about one hour up to about four hours.

9. The method of claim 1 further comprising:
selecting boron nitride powder with an oxygen content of about 0.5 weight percent or less.

10. The method of claim 1 further comprising:
prepressing the boron nitride powder before placing in the refractory metal container.

11. The method of claim 10 further comprising:
machining the prepressed boron nitride powder to fit into the container.

12. The method of claim 3 further comprising:
evacuating the refractory metal container filled with boron nitride powder and hermetically sealing the container prior to hot isostatically pressing.

13. The method of claim 1 further comprising:
removing the refractory metal container after hot isostatically pressing.

14. A method of densifying hexagonal boron nitride comprising:
placing boron nitride powder in a refractory metal container consisting essentially of tantalum, niobium, tungsten, molybdenum or alloys thereof with a wall thickness of about 1.6 mm;
hot isostatically pressing the refractory container filled with boron nitride powder at about 1800° C. and at about 30 KSI (206.8 MPa) for about one hour up to about four hours to form boron nitride with a bulk density greater than 2.0 g/cc and an isotropically uniform microstructure.

* * * * *